United States Patent
Stjernholm et al.

(10) Patent No.: US 11,096,041 B2
(45) Date of Patent: Aug. 17, 2021

(54) ALLOCATION OF A 5G RADIO BASE STATION TO A GROUP OF RADIO BASE STATIONS COOPERATING TO CONSTITUTE A SYSTEM AREA

(71) Applicant: Telefonaktiebolaget LM Ericsson (publ), Stockholm (SE)

(72) Inventors: Paul Stjernholm, Lidingö (SE); Stefan Engström, Linköping (SE); Peter Loborg, Linköping (SE); Tomas Nylander, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 241 days.

(21) Appl. No.: 16/090,787

(22) PCT Filed: Apr. 5, 2016

(86) PCT No.: PCT/SE2016/050282
§ 371 (c)(1),
(2) Date: Oct. 2, 2018

(87) PCT Pub. No.: WO2017/176175
PCT Pub. Date: Oct. 12, 2017

(65) Prior Publication Data
US 2020/0329367 A1    Oct. 15, 2020

(51) Int. Cl.
*H04W 8/22* (2009.01)
*H04W 24/02* (2009.01)
(52) U.S. Cl.
CPC ............ *H04W 8/22* (2013.01); *H04W 24/02* (2013.01)

(58) Field of Classification Search
CPC . H04W 88/08; H04W 24/02; H04W 36/0083; H04W 36/0061;
(Continued)

(56) References Cited

U.S. PATENT DOCUMENTS

2011/0294527 A1* 12/2011 Brueck ........... H04W 36/00835
455/466
2015/0148040 A1* 5/2015 Ehrlich ................. H04W 24/02
455/436
(Continued)

FOREIGN PATENT DOCUMENTS

WO    WO 2011/150250 A1    12/2011
WO    WO-2015169367 A1 * 11/2015 .......... H04J 11/0093

OTHER PUBLICATIONS

International Search Report and Written Opinion of the International Searching Authority, PCT/SE2016/050282, dated Jan. 23, 2017, 17pages.
(Continued)

*Primary Examiner* — Ronald Eisner
(74) *Attorney, Agent, or Firm* — Sage Patent Group

(57) ABSTRACT

It is provided a method for configuring a first radio network node to join a system area of a mobile network, each system area being served by one or more radio network nodes configured to collaborate in user data transmissions. The method is performed in a configuration device and comprises the steps of: obtaining system area data, using the first radio network node, relating to at least one system area of a second radio network node; selecting a system area for the first radio network node to join based on the system area data; and triggering the first radio network node to join the selected system area.

17 Claims, 5 Drawing Sheets

(58) Field of Classification Search
CPC ........... H04W 36/00835; H04W 24/08; H04W 92/20; H04W 16/00–32; H04W 28/00–26; H04W 72/00–14; H04W 8/22; H04W 36/0058; H04W 36/0069; H04W 36/00837; H04W 36/0085; H04W 36/0094; H04W 36/24; H04W 36/28; H04B 17/382; H04B 17/02–12; H04B 7/02–0413; H04B 7/0491–0613; H04B 7/0621–0667

See application file for complete search history.

(56) References Cited

U.S. PATENT DOCUMENTS

2015/0208263 A1* 7/2015 Behravan .............. H04L 5/0057
370/252
2017/0054477 A1* 2/2017 Natarajan ............. H04W 16/10

OTHER PUBLICATIONS

3$^{rd}$ Generation Partnership Project; Technical Specification Group Radio Access Network; Study on UMTS Heterogenous Networks (Release 12) 3GPP TR 25.800 V12.1.0 (Dec. 2013) XP050729149, 165 pages.

"Overall System Operation And Network Topology For 5G New Radio Interface," 3GPP TSG RAN WG1 #84bis, Busan, Korea, Apr. 11-15, 2016, R1-162184, XP051079515, 3 pages.

"Uplink Performance With Combined Cell Deployment In Heterogeneous Networks," 3GPP TSG RAN WG1 Meeting#71, New Orleans, USA, Nov. 12-16, 2012, R1-125222, XP050663079, 4 pages.

* cited by examiner

ALLOCATION OF A 5G RADIO BASE STATION TO A GROUP OF RADIO BASE STATIONS COOPERATING TO CONSTITUTE A SYSTEM AREA

CROSS REFERENCE TO RELATED APPLICATIONS

This application is a 35 U.S.C. § 371 national stage application of PCT International Application No. PCT/SE2016/050282 filed on Apr. 5, 2016, the disclosure and content of which is incorporated by reference herein in its entirety.

TECHNICAL FIELD

The invention relates to configuring a radio network node of a mobile network. More specifically, it is presented a method, configuration device, computer program, and computer program product for configuring a radio network node of a mobile network.

BACKGROUND

The next generation 5 G (fifth generation) Radio Access Network (RAN) is currently being discussed on a conceptual level. In the 5G RAN, the concept of a cell will potentially not be as stringently applied as e.g. in LTE (Long Term Evolution). In LTE, a cell is associated with specific parameters like the Cell Global Identity (CGI), Physical Cell Identity (PCI), and Root Sequence Index (RSI) uniquely configured per cell, wherein the latter two are unique only in a relatively local context. The wireless device is aware of the cell and needs to be reconfigured when moving between cells in active mode.

The LTE standard allows for coordination of transmission over multiple cells to a UE, e.g. using combined cell (CC), coordinated multipoint transmission (CoMP), carrier aggregation (CA) or dual connectivity (DC). The former two operates on the same frequency, whereas the latter two operates on different frequencies.

In the 5G RAN concept, the cell is replaced with a new cell concept, herein denoted system area, which resembles a combined cell or a CoMP cell group. Multiple antenna devices of multiple radio network nodes, e.g. using the same frequency, could constitute a system area.

When a new radio network node is deployed in the mobile network, this needs to be configured to form part of the network. However, such configuration is time consuming and resource demanding. Any reduction in requirements of such configuration is of great value.

SUMMARY

It is an object to provide a way for a radio network node to be configured without any manual intervention, at least for the configuration of which system area the radio network node should belong to.

According to a first aspect, it is provided a method for configuring a first radio network node to join a system area of a mobile network, each system area being served by one or more radio network nodes configured to collaborate in user data transmissions. The method is performed in a configuration device and comprises the steps of: obtaining system area data, using the first radio network node, relating to at least one system area of a second radio network node; selecting a system area for the first radio network node to join based on the system area data; and triggering the first radio network node to join the selected system area.

The step of obtaining system area data may comprise receiving metrics from a wireless device relating to downlink signals to the wireless device.

The step of obtaining system area data may comprise receiving metrics from a second radio network node relating to uplink signals from the wireless device.

The system area data may comprise a backhaul metric for a link between the first radio network node and a corresponding second radio network node having a different system area than the system area of the first radio network node.

The system area data may comprise a first link quality metric for at least one link between the first radio network node and a wireless device.

The system area data may comprise a second link quality metric for at least one link between a second radio network node and a wireless device, the second radio network node having a different system area than the system area of the first radio network node.

The system area data may comprise a mobility procedure metric related to mobility procedure between the first radio network node and a corresponding second radio network node having a different system area than the system area of the first radio network node.

The step of triggering the first radio network node to join the selected system area may comprise transmitting a request to join the selected area, and when the request is denied, the method returns to the step of selecting a system area, wherein the previously selected system area is now excluded from being selected.

The configuration device may form part of the first radio network node.

The configuration device may form part of a node being separate from all radio network nodes of the mobile network.

According to a second aspect, it is provided a configuration device for configuring a first radio network node to join a system area of a mobile network, each system area being served by one or more radio network nodes configured to collaborate in user data transmissions. The configuration device comprises: a processor; and a memory storing instructions that, when executed by the processor, causes the configuration device to: obtain system area data, using the first radio network node, relating to at least one system area of a second radio network node; select a system area for the first radio network node to join based on the system area data; and trigger the first radio network node to join the selected system areas.

The instructions to obtain system area data may comprise instructions that, when executed by the processor, causes the configuration device to receive metrics from a wireless device relating to downlink signals to the wireless device.

The instructions to obtain system area data may comprise instructions that, when executed by the processor, causes the configuration device to receive metrics from a second radio network node relating to uplink signals from the wireless device.

The system area data may comprise a backhaul metric for a link between the first radio network node and a corresponding second radio network node having a different system area than the system area of the first radio network node.

The system area data may comprise a first link quality metric for at least one link between the first radio network node and a wireless device.

The system area data may comprise a second link quality metric for at least one link between a second radio network node and a wireless device, the second radio network node having a different system area than the system area of the first radio network node.

The system area data may comprise a mobility procedure metric related to mobility procedure between the first radio network node and a corresponding second radio network node having a different system area than the system area of the first radio network node.

The instructions to trigger the first radio network node to join the selected system area may comprise instructions that, when executed by the processor, causes the configuration device to transmit a request to join the selected area, and when the request is denied, the instructions to select a system area are executed, wherein the previously selected system area is now excluded from being selected.

According to a third aspect, it is provided a radio network node comprising the configuration device according to the second aspect, wherein the radio network node functions as the first radio network node.

According to a fourth aspect, it is provided a configuration device comprising: means for obtaining system area data, using the first radio network node, relating to at least one system area of a second radio network node forming part of a mobile network comprising a plurality of system areas, each system area being served by one or more radio network nodes configured to collaborate in user data transmissions; means for selecting a system area for the first radio network node to join based on the system area data; and means for triggering the first radio network node to join the selected system areas.

According to a fifth aspect, it is provided a computer program for configuring a first radio network node to join a system area of a mobile network, each system area being served by one or more radio network nodes configured to collaborate in user data transmissions, the computer program comprising computer program code which, when run on a configuration device causes the configuration device to: obtain system area data, using the first radio network node, relating to at least one system area of a second radio network node; select a system area for the first radio network node to join based on the system area data; and trigger the first radio network node to join the selected system areas.

According to a sixth aspect, it is provided a computer program product comprising a computer program according to the fifth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In 5G RAN, the area covered by multiple radio network nodes and their antenna devices on one frequency may constitute a system area, where the latency between the associated radio network nodes are sufficiently low to allow 5G RAN services to operate.

Embodiments presented herein allow a new 5G radio network node to be deployed with a basic initial configuration, comprising one or more default system areas that do not need to be manually configured nor planned. During operation, based on measurements from one or more wireless devices and/or network side measurements, the new radio network node will be configured to form part of an existing system area without manual input, if it is deemed that network performance would benefit from that.

Here now follows a number of definitions of terms used herein.

System area is to be construed as a physical coverage area served by one or more radio network nodes to provide downlink and uplink communication ability for wireless devices. The radio network nodes of one system area collaborate in user data transmissions for uplink and/or downlink.

User data is to be construed as data provided between end points in a communication, for use by higher protocol layers.

Radio network node is to be construed as a device in a mobile network defining how radio reception and transmission occurs. The radio network node may, but does need to be, located at a separate site from antennas used in the radio communication. The radio network node can optionally be split over multiple sites.

Configuration device is to be construed as a device responsible for configuring a radio network node in terms of what system area to join. The configuration device may, but does not need to, form part of the radio network node.

Mobility procedure is to be construed as procedure related to managing mobility of wireless devices, e.g. handovers from one system area to another.

Wireless device is to be construed as user device which can be portable or fixed and can communicate over a wireless interface to a mobile network. Can e.g. be a mobile phone, smart phone or a tablet/laptop with wireless connectivity. The wireless device can also be referred to as User Equipment (UE).

Figure 1A:
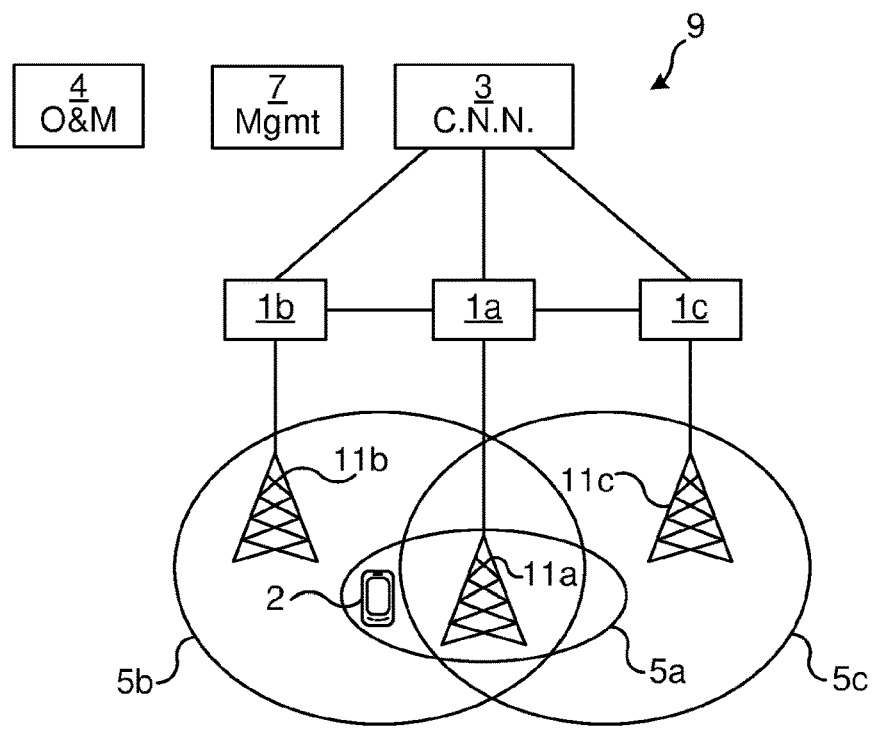
FIGS. 1A-B are schematic diagrams illustrating how a first radio network node is configured to join a system area of a mobile network for throughput increase.
Figure 1B:
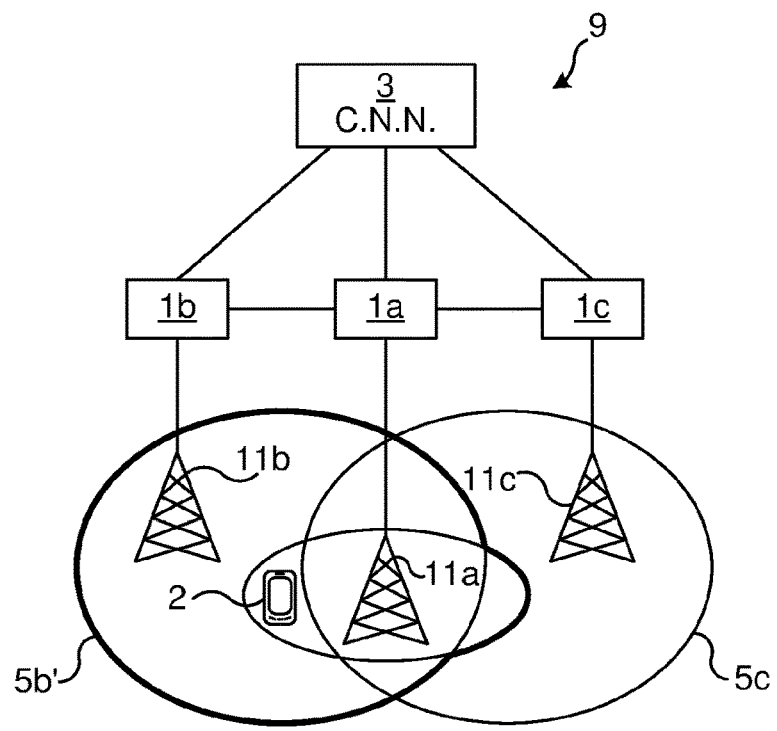

FIGS. 1A-B are schematic diagrams illustrating how a first radio network node is configured to join a system area of a mobile network 9. The mobile network 9 comprises a core network comprising a number of core network nodes 3. Moreover, there is a number of radio network nodes 1a-c, here in the form of radio base stations. The radio network nodes 1a-c provide radio connectivity over a wireless interface to wireless devices 2. Each radio network node 1a-c can be implemented in a single unit or using several (optionally shared) units. When several units are employed, these may optionally be distributed in different locations. Each radio network node serves a physical area by forming part of a system area. Several radio network nodes can form part of the same system area. In this way, handovers are not needed when wireless devices move to get served by the different radio network nodes. Hence, when multiple radio network nodes form part of a system area, these radio network nodes collaborate in user data transmissions for uplink and/or downlink.

The term wireless device is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless device 2 can comprise a number of wires for internal and/or external purposes.

The communication network 9 may e.g. comply with a 5G standard on its own or in combination with any one or more of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface, uplink (UL) communication occurs from the wireless device 2 to the radio network nodes 1a-c and downlink (DL) communication occurs from one or more radio network nodes to the wireless device 2. The quality of the wireless radio interface to each wireless device 2 can vary over time and depending on the position of the wireless device 2, due to effects such as fading, multipath propagation, interference, etc.

In this example, there is a first radio network node 1a, a second radio network node 1b and a third radio network node 1c. The first radio network node is connected to a first antenna device 11a. The second radio network node 1b is connected to a second antenna device 11b. The third radio network node 1c is connected to a third antenna device 11c.

Optionally, an antenna device can be integrated with its radio network node. When the antenna device is separated from the radio network node as shown here, it is also known as a remote radio node.

It is to be noted that the first, second and third radio network nodes 1a-c can be of the same type and can be deployed in any order. The reference to first, second and third does not imply any order per se; it is only a way to allow distinction between the radio network nodes. For instance, in the example here, the second radio network node 1b and the third radio network node 1c have already been deployed when the first radio network node 1a is deployed.

It is to be noted that each radio network node 1a-c can be connected to one or more respective antenna devices, even if it is here shown only one antenna device per radio network node. Furthermore, a single antenna device can serve several system areas, e.g. on different frequencies.

In FIG. 1A, the second radio network node 1b provides coverage (using its second antenna device 11b) in a second system area 5b. The third radio network node 1c provides coverage (using its third antenna device 11c) in a third system area 5c.

The first radio network node 1a is a radio network node which is to be configured in the mobile network 9. For instance, the first radio network node 1a can be a new radio network node or a radio network node that needs to be reconfigured. Initially, as shown in FIG. 1A, the first radio network node 1a provides coverage (using its first antenna device 11a) in a first system area 5a.

As explained in further detail below, a configuration device obtains system area data of system areas of one or more other radio network nodes 1b, 1c. Based on the system area data, the configuration device causes the first radio network node 1a to join the appropriate system area. The configuration device can be provided in the first radio network node 1a itself or it can be provided in any other suitable network node, such as a management node 7.

In FIG. 1B, it is illustrated how the first network node 1a has joined the second system area 5b of FIG. 1A, creating a modified second system area 5b'. In this way, throughput in the second system area 5b is improved.

Figure 2A:
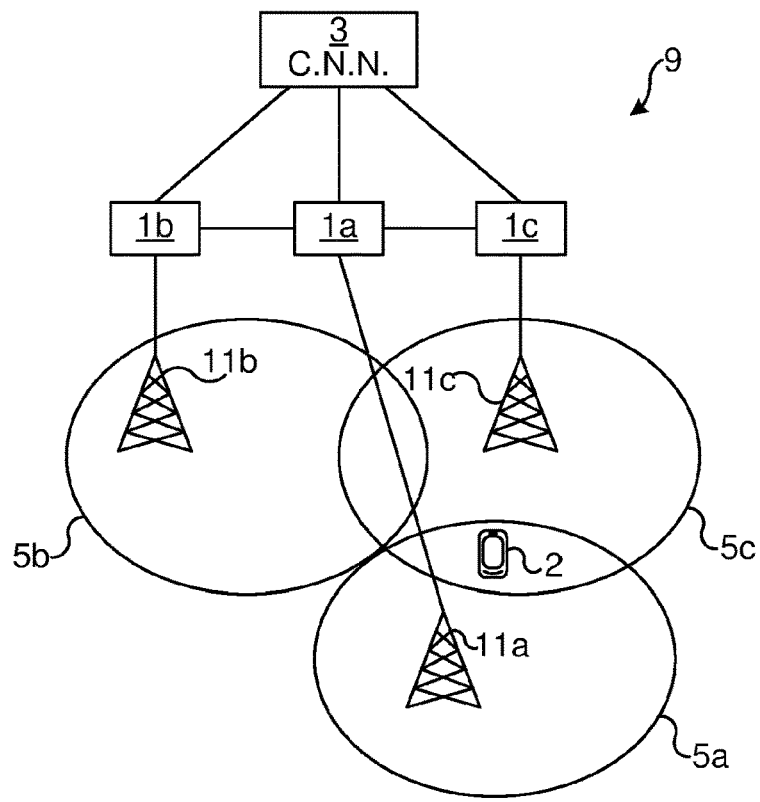
FIGS. 2A-B are schematic diagrams illustrating how a first radio network node is configured to join a system area of a mobile network for coverage extension.
Figure 2B:
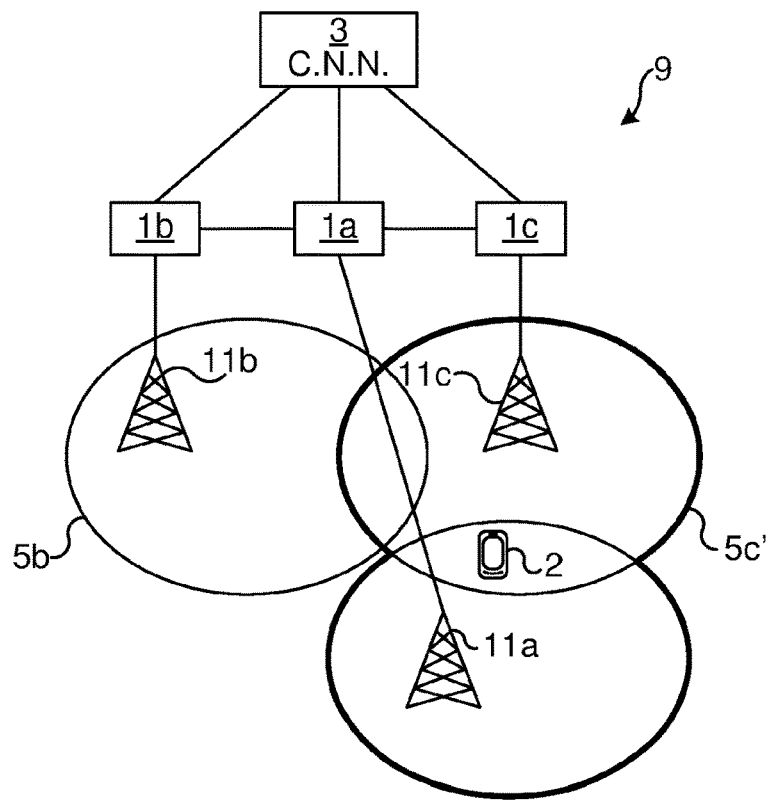

Looking now to FIG. 2A, the first antenna device 11a is installed in a slightly different position than in FIG. 1A. Again, system area data is obtained. Here, however, the first network node 1a joins the third system area 5c as shown in FIG. 2B, creating a modified third system area 5c'. In this way, the third second system area 5c provides a greater coverage area.

Figure 3:
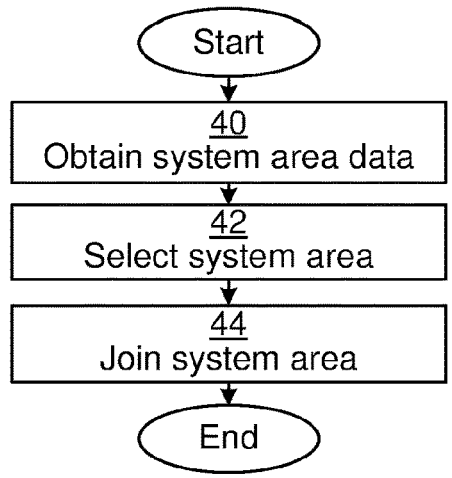
FIG. 3 is a flow chart illustrating embodiments of methods for configuring a first radio network node to join a system area of a mobile network.

FIG. 3 is a flow chart illustrating embodiments of methods for configuring a first radio network node to join a system area of a mobile network. As explained above, each system area is served by one or more radio network nodes configured to collaborate (when more than one radio network node) in user data transmissions.

As explained above, the configuration device can form part of the first radio network node or of a node being separate from all radio network nodes of the mobile network.

Prior to this method starting, the first radio network node has been assigned an initial configuration e.g. at production or a standard configuration easily applied at a central site of the operator of the mobile network. The initial configuration can comprise an initial system area identity which is at least locally unique. The initial system area identity is optionally selected from a group of identities which are pre-allocated for initial configuration. This initial configuration allows the first radio network node to be functional at deployment, and can also communicate with wireless devices, other radio network nodes and the core network even before the first radio network node is assigned to any other system area.

In an obtain system area data step 40, system area data is obtained using the first radio network node. The system area data relates to at least one system area of a second radio network node.

In one embodiment, this comprises receiving metrics from a wireless device relating to downlink signals to the wireless device. Thus, the system area data in this case comprises the metrics received from the wireless device. The downlink signals can be downlink signals received from the first radio network node or from another radio network node. By obtaining metrics relating to downlink signals from another radio network node, a reference to the other radio network node and its system area may be determined and/or, radio interference between the first radio network node and the other radio network node may be estimated. The signals from the other radio network node could be e.g. SSI (System Signature Indication) or based on downlink reference signals (RSs) from the other radio network node. The evaluation can be made on absolute signal levels or levels relative levels on the signal from the first radio network node.

The number of wireless devices with bad coverage between the first radio network node and a second radio network node may be estimated by gathering statistics on the number of wireless devices that have a poor connection with the first radio network node and the second radio network node, when these two radio network nodes still are the ones capable of providing the best connections for the wireless device. The identification of this situation may be made by evaluating wireless device reports on strength and quality of signals from the first radio network node and the second radio network node.

The system area overlap may also be estimated by ordering wireless devices in active mode in the system area of the first radio network node to measure on neighbouring system areas, e.g. on the same frequency, reporting for example their SSI or other downlink reference signals. Based on the reported SSIs or reference signals, the relative amount of reported system area identities can be derived, denoted hit rate.

Alternatively or additionally, this comprises receiving metrics from a second radio network node relating to uplink signals from the wireless device. Thus, the system area data in this case comprises the metrics received from the second radio network node.

Alternatively or additionally, the system area data comprises a backhaul metric for a link between the first radio network node and a corresponding second radio network node having a different system area than the system area of the first radio network node. This metric can be based on latency and/or bandwidth of the backhaul link.

Alternatively or additionally, the system area data comprises a first link quality metric for at least one link between the first radio network node and a wireless device.

Alternatively or additionally, the system area data comprises a second link quality metric for at least one link between a second radio network node and a wireless device. The second radio network node has a different system area than the system area of the first radio network node.

Alternatively or additionally, the system area data can comprise a mobility procedure metric related to mobility procedure between the first radio network node and a second radio network node having a different system area than the system area of the first radio network node. The metric can e.g. be based on counting a number wireless device connections moved between the two radio network nodes in either direction and/or any failed attempt of such connection handover. A high such number is an indication that the two network nodes would benefit from being part of the same system area to reduce the number of handovers.

In a select system area step 42, a system area is selected for the first radio network node to join based on the system area data. The selection can be based on the most recently available system area data or an average of the data over a period of time.

The resulting numbers for the different system areas in the vicinity of the first radio network node can then be compared with each other or with set thresholds to select the system area that would be best to join for the first radio network node.

For instance, if the compared numbers are denoted $A_i$ and $T_i$, where A is a measured parameter of system area data, T is a configured value and i is an index of the compared quantity, example criteria to select the SA to use could e.g. be expressed as follows.

1. Select the system area with the biggest $A_1$.
2. Select the system area with the biggest $A_1$ where also $A_3 > T_3$.
3. Select the system area with the biggest sum $k_1 A_1 + k_2 A_2 + k_3 A_3 + k_4 A_4 + k_5 A_5$, where $k_i$ is a weight coefficient for the $A_i$ quantity.

By joining the system area, the respective radio node reconfigures to allow combined operations on layer 3 and/or layer 2. The reconfigurations may e.g. allow coordinated multi-point transmission and MIMO (Multiple Input Multiple Output) across the antenna transmission points and allow sharing a common northbound interface towards the core network.

In a join system area step 44, the configuration device triggers the first radio network node to join the selected system areas. When the configuration device is comprised in the first radio network node, this step comprises performing the actions to join the selected system area. For instance, this can comprise transmitting a request to join the selected area. When the request is denied, the method can return to the step of selecting a system area. In this case, the previously selected system area is now excluded from being selected, to prevent repeated failures to join a selected system area.

FIGS. 4A-F are sequence diagrams illustrating at least parts of embodiments of the methods illustrated in FIG. 3. The sequence diagrams illustrate communication between a wireless device 2, a first radio network node 1a and a second radio network node 1b. The first radio network node 1a is a radio network node to be configured and is referred to here for ease of explanation as a new network node 1a even if the configuration may be a reconfiguration and the new network node 1a may be older than the second radio network node 1b. The second radio network node 1b is referred here, for ease of explanation, as an existing radio network node 1b. It is to be noted that the sequences can be expanded for the new radio network node to communicate with additional existing radio network nodes and make a proper comparison in the selection of system area to join.

Figure 4A:
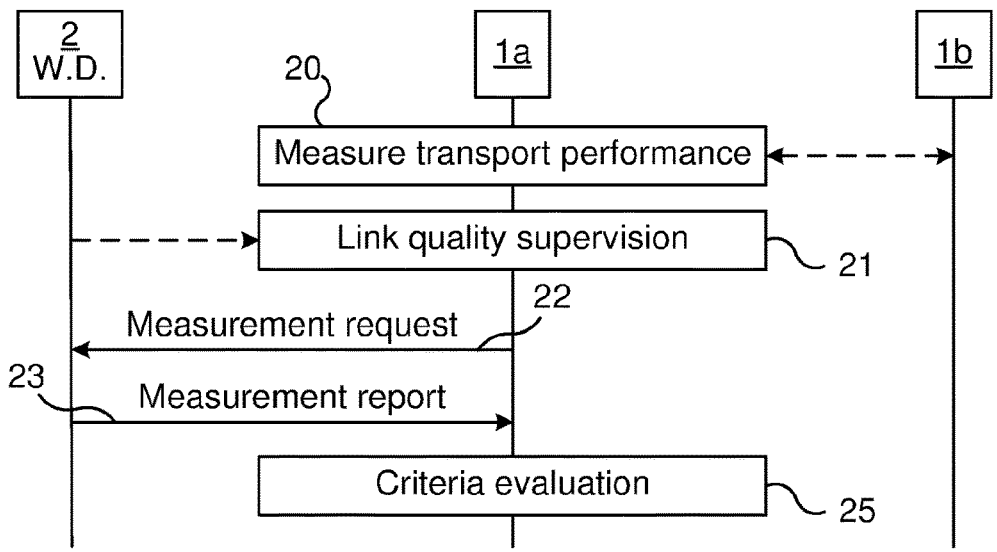
FIGS. 4A-F are sequence diagrams illustrating at least parts of embodiments of the methods illustrated in FIG. 3.

Looking first to FIG. 4A, the new radio network node 1a here obtains system area data by measuring 20 transport performance to the existing radio network node 1b. This implies that the system area data comprises a backhaul metric for a link between the new radio network node 1a and the existing radio network node 1b. Moreover, the new radio network node 1a obtains 21 data of link quality between the wireless device 2 and the new radio network node 1a. Poor link quality may indicate interference problems.

Also, the new radio network node 1a transmits a measurement request 22 to the wireless device 2. The wireless device 2 measures e.g. SSI or reference signals on one or more given frequencies, after which the wireless device 2 measures and sends a measurement report 23 based on the measurement to the new radio network node 1a. The reporting can be configured to always report, only report if quality of the current SSI/RS is below a configured threshold, only report if quality of the new radio network node SSI/RS is below a configured threshold and the quality of the existing radio network node SSI/RS is above a configured threshold. Once all the system area data is available, the new radio network node 1a evaluates 25 the system area data and selects a system area to join, corresponding to step 42. The evaluation can alternatively be performed in a node separate from the first radio network node (as explained above).

Figure 4B:
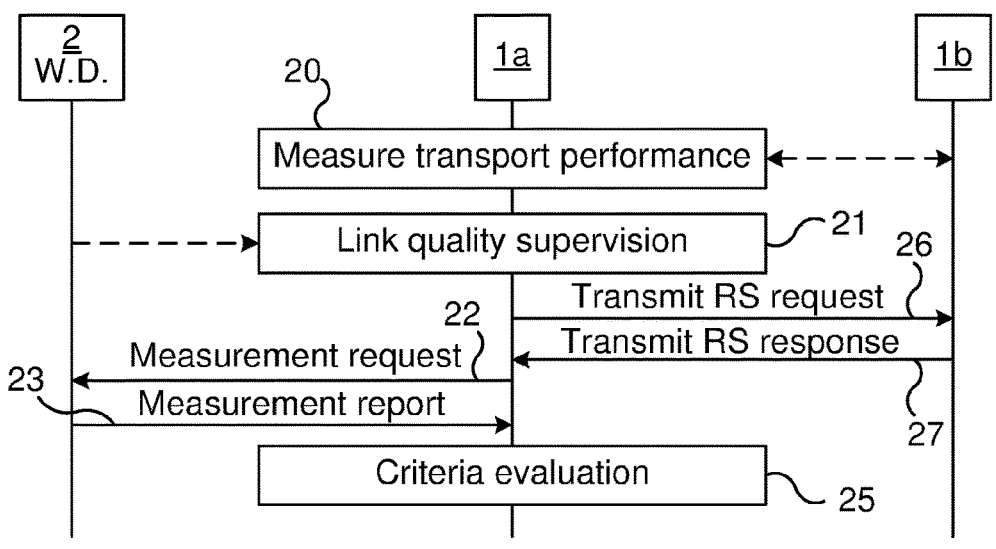

Looking now to FIG. 4B, only differences to the sequence of FIG. 4A will be described. Prior to the measurement request 22, the new radio network node 1a here sends a transmit RS (reference signal) request 26 to the existing radio network node 1b. The existing radio network node 1b acknowledges the transmit RS request 26 with a transmit RS response 27 to the new radio network node 27. The wireless device 2 then measures the RS from the existing radio network node 1b and reports to the new radio network node 1a.

Figure 4C:
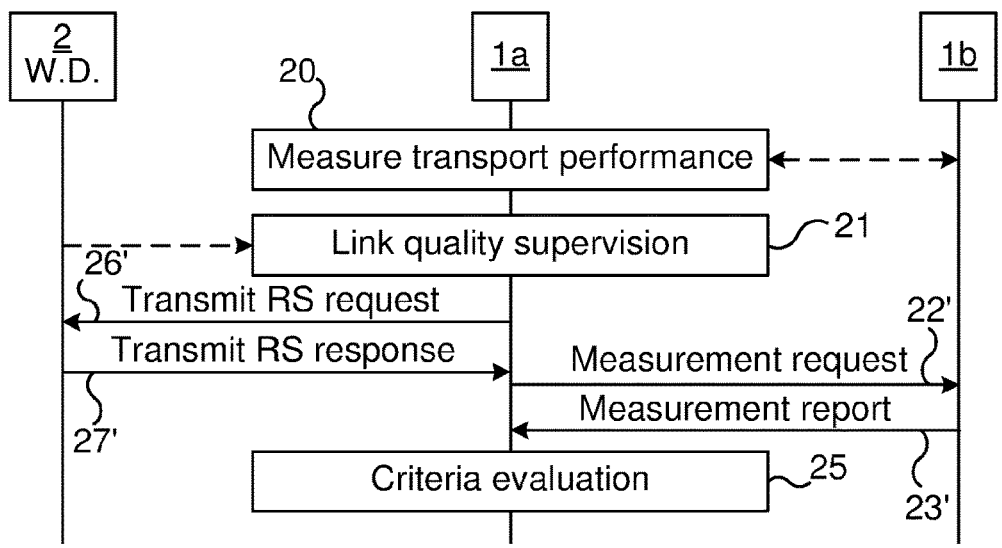

Looking now to FIG. 4C, only differences to the sequence of FIG. 4A will be described. This embodiment employs uplink measurements. Here, the new radio network node 1a sends a transmit RS request 26' to the wireless device 2. The wireless device 2 acknowledges the transmit RS request 26' with a transmit RS response 27' to the new radio network node 27 indicating it will transmit uplink reference signals. The new radio network node 1a then transmits a measurement request 22' to the existing radio network node 1b, after which the existing radio network node 1b measures the uplink reference signal from the wireless device 2 and sends a measurement report 23' based on the uplink measurement to the new radio network node 1a.

Figure 4D:
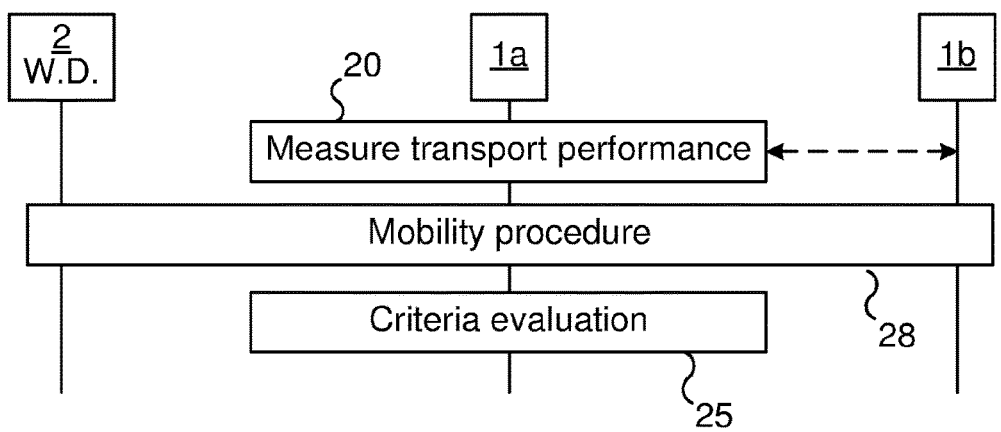

Looking now to FIG. 4D, only differences to the sequence of FIG. 4A will be described. Here, there is a mobility procedure 28. The mobility procedure relates to the management of mobility of wireless devices, e.g. handovers from one system area to another (successful or not). Information related to the mobility procedure (such as frequency of procedures, involved radio network nodes, etc.) are then used as system area data in the criteria evaluation 25.

Figure 4E:
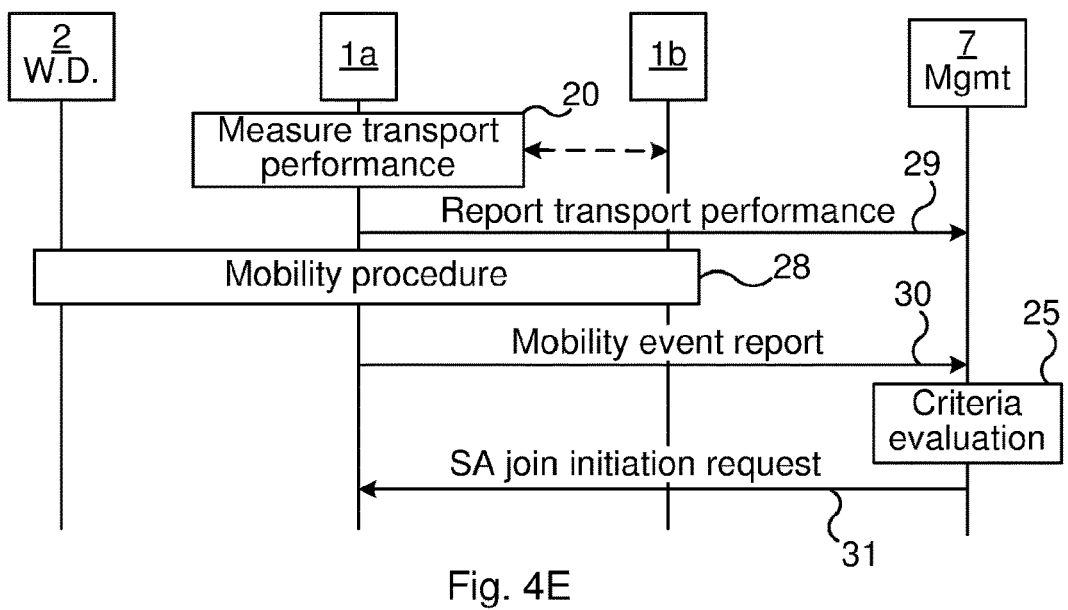

Looking now to FIG. 4E, only differences to the sequence of FIG. 4D will be described. Here, the backhaul link metrics are reported 29 from the new radio network node 1a to a management node 7. After the mobility procedure(s) 28, the new radio network node 1a also sends a mobility event report 30 to the management node 7. The mobility event report 30 can be sent for every mobility event or it can be aggregated for several mobility events. In this way, the management node 7 is provided with sufficient information to make the criteria evaluation 25. After the evaluation, the management node 7 triggers the new radio network node 1a to join a system area by sending a SA (system area) join initiation request 31 to the new radio network node 1a.

Figure 4F:
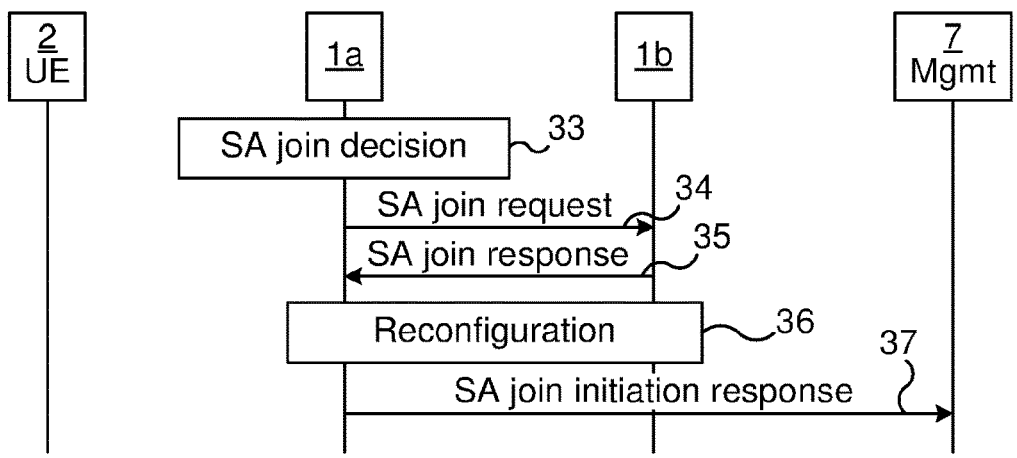

FIG. 4F shows a sequence related to the new radio network node 1a joining a system area. By using any of the procedures mentioned above, the new radio network node 1a reaches an SA join decision 33, e.g. by selecting a system area to join based on the system area information as described above. The new radio network node 1a then transmits an SA join request 34 to the existing radio network node 1b forming part of the system area to join. The existing radio network node 1b evaluates the request and when the joining is granted, the existing radio network node 1b sends a positive SA join response 35 to the new radio network node 1a. At this point, a reconfiguration 36 takes place such that the system area of which the existing radio network node 1b forms part is modified to also include the coverage of the new radio network node 1a. Finally, the new radio network node 1a transmits an SA join initiation response 37 to the management node 7, informing the management node that the new radio network node 1a forms part of the system area of the existing radio network node 1b.

Figure 5:
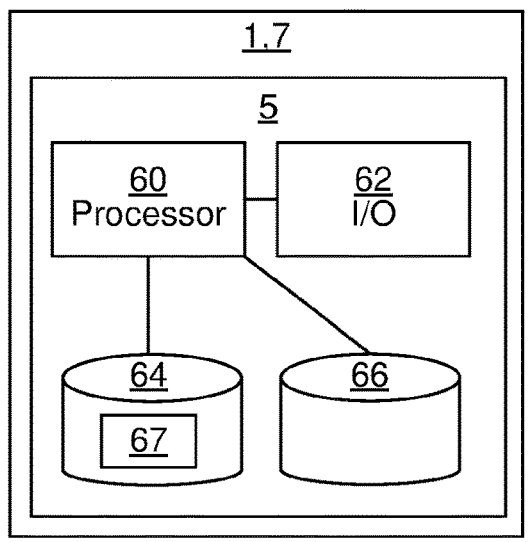
FIG. 5 is a schematic diagram illustrating components of the configuration device implemented in one of the network nodes of FIGS. 1A-B.

FIG. 5 is a schematic diagram illustrating components of the configuration device 5. The configuration device 5 is here illustrated forming part of a host device being the management node 7 or any one of the radio network nodes 1a-c of FIG. 1A, here represented by a single radio network node 1. Any one or more of the components of the configuration device 5 can be shared with its host device.

A processor 60 is provided using any combination of one or more of a suitable central processing unit (CPU), multi-processor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The configuration device 5 further comprises an I/O interface 62 for communicating with other external entities. Optionally, the I/O interface 62 also includes a user interface.

Other components of the configuration device 5 and its host device 1, 7 are omitted in order not to obscure the concepts presented herein.

Figure 6:
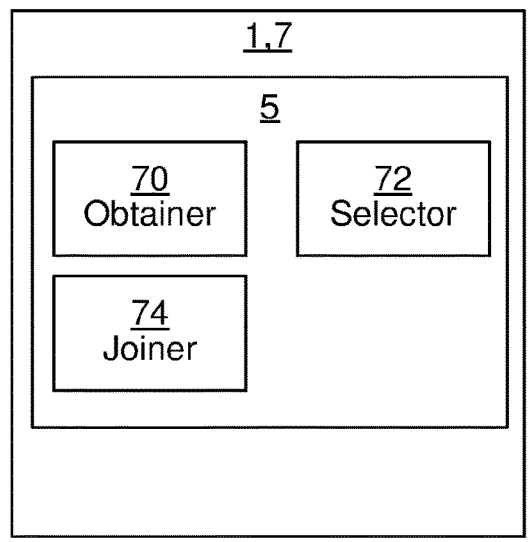
FIG. 6 is a schematic diagram showing functional modules of the configuration device of FIG. 5 implemented in one of the host devices according to one embodiment.

FIG. 6 is a schematic diagram showing functional modules of the configuration device 5 of FIG. 5 implemented in one of the host devices 1, 7 according to one embodiment. The modules are implemented using software instructions such as a computer program executing in the host device 1, 7. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the method illustrated in FIG. 3.

An obtainer 70 corresponds to step 40. A selector 72 corresponds to step 42. A joiner 74 corresponds to step 44.

Figure 7:
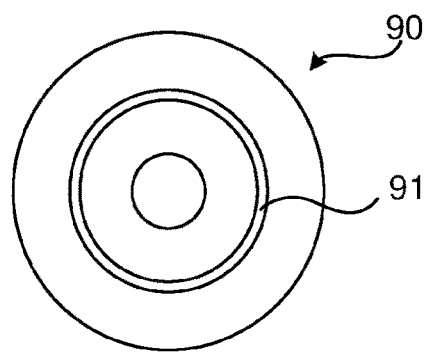
FIG. 7 shows one example of a computer program product comprising computer readable means.

FIG. 7 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for configuring a first radio network node to join a system area of a mobile network, each system area being served by one or more radio network nodes configured to collaborate in user data transmissions, the method being performed in a configuration device and comprising the steps of:

obtaining a count of a number of failed attempts to move wireless device connections between the first radio network node and a second radio network node, wherein the second radio network node has a second system area which is different from a first system area of the first radio network node;

selecting a system area for the first radio network node to join based on the number of failed attempts;

triggering the first radio network node to send a request to join the selected system area; and upon receiving a positive response to the request, joining the first system area of the first radio network node with the selected system area.

2. The method according to claim 1, wherein the step of obtaining a count of a number of failed attempts comprises receiving metrics from a wireless device relating to downlink signals to the wireless device.

3. The method according to claim 1, wherein the step of obtaining a count of a number of failed attempts comprises receiving metrics from the second radio network node relating to uplink signals from the wireless device to the second radio network node and measured by the second radio network node.

4. The method according to claim 1, wherein the selecting of the system area data is further based on a backhaul metric for a link between the first radio network node and a corresponding second radio network node having a different system area than the system area of the first radio network node.

5. The method according to claim 1, wherein the selecting of the system area data is further based on a first link quality metric for at least one link between the first radio network node and a wireless device.

6. The method according to claim 1, wherein the selecting of the system area data is further based on a second link quality metric for at least one link between the second radio network node and a wireless device, the second radio network node having a different system area than the system area of the first radio network node.

7. The method according to claim 1, wherein the step of triggering the first radio network node to send a request to join the selected system area comprises transmitting a request to join the selected area, and when the request is denied, the method returns to the step of selecting a system area, wherein the previously selected system area is now excluded from being selected.

8. The method according to claim 1, wherein the configuration device forms part of the first radio network node.

9. The method according to claim 1, wherein the configuration device forms part of a node being separate from all radio network nodes of the mobile network.

10. A configuration device for configuring a first radio network node to join a system area of a mobile network, each system area being served by one or more radio network nodes configured to collaborate in user data transmissions, the configuration device comprising:

a processor; and a memory storing instructions that, when executed by the processor, causes the configuration device to:

obtain a count of a number of failed attempts to move wireless device connections between the first radio network node and a second radio network node, wherein the second radio network node has a second system area which is different from a first system area of the first radio network node:

select a system area for the first radio network node to join based on the number of failed attempts;

trigger the first radio network node to send a request to join the selected system area; and upon receiving a positive response to the request, join the first system area of the first radio network node with the selected system area.

11. The configuration device according to claim 10, wherein the instructions to obtain a count of a number of failed attempts comprise instructions that, when executed by the processor, causes the configuration device to receive metrics from a wireless device relating to downlink signals to the wireless device.

12. The configuration device according to claim 10, wherein the instructions to obtain a count of a number of failed attempts comprise instructions that, when executed by the processor, causes the configuration device to receive metrics from the second radio network node relating to uplink signals from the wireless device to the second radio network node and measured by the second radio network node.

13. The configuration device according to claim 10, wherein the selection of the system area data is further based on a backhaul metric for a link between the first radio network node and a corresponding second radio network node having a different system area than the system area of the first radio network node.

14. The configuration device according to claim 10, wherein the selection of the system area data is further based on a first link quality metric for at least one link between the first radio network node and a wireless device.

15. The configuration device according to claim 10, wherein the selection of the system area data is further based on a second link quality metric for at least one link between the second radio network node and a wireless device, the second radio network node having a different system area than the system area of the first radio network node.

16. The configuration device according to claim 10, wherein the instructions to trigger the first radio network node to send a request to join the selected system area comprise instructions that, when executed by the processor, causes the configuration device to transmit a request to join the selected area, and when the request is denied, the instructions to select a system area are executed, wherein the previously selected system area is now excluded from being selected.

17. A computer program product for configuring a first radio network node to join a system area of a mobile network, each system area being served by one or more radio network nodes configured to collaborate in user data transmissions, the computer program product comprising a non-transitory computer readable medium having computer program code which, when run on a configuration device causes the configuration device to:

obtain a count of a number of failed attempts to move wireless device connections between the first radio network node and a second radio network node, wherein the second radio network node has a second system area which is different from a first system area of the first radio network node:

select a system area for the first radio network node to join based on the number of failed attempts;

trigger the first radio network node to send a request to join the selected system areas; and upon receiving a positive response to the request, join the first system area of the first radio network node with the selected system area.

\* \* \* \* \*